US 11,496,011 B2

(12) United States Patent
Schemmel et al.

(10) Patent No.: US 11,496,011 B2
(45) Date of Patent: Nov. 8, 2022

(54) FORM-WOUND COIL HAVING PREVIOUS WINDING OF MICA TAPE

(71) Applicant: SIEMENS MOBILITY GMBH, Munich (DE)

(72) Inventors: Florian Schemmel, Nuremberg (DE); Markus Hoesle, Erlangen (DE); Christoph Schultheiss, Rednitzhembach (DE)

(73) Assignee: Siemens Mobility GmbH, Munich (DE)

( * ) Notice: Subject to any disclaimer, the term of this patent is extended or adjusted under 35 U.S.C. 154(b) by 432 days.

(21) Appl. No.: 16/632,575

(22) PCT Filed: Jun. 26, 2018

(86) PCT No.: PCT/EP2018/067043
§ 371 (c)(1),
(2) Date: Jan. 21, 2020

(87) PCT Pub. No.: WO2019/015922
PCT Pub. Date: Jan. 24, 2019

(65) Prior Publication Data
US 2020/0244128 A1 Jul. 30, 2020

(30) Foreign Application Priority Data
Jul. 21, 2017 (EP) .................................. 17182597

(51) Int. Cl.
*B32B 27/12* (2006.01)
*H02K 3/30* (2006.01)
(Continued)

(52) U.S. Cl.
CPC ................. *H02K 3/30* (2013.01); *B32B 5/02* (2013.01); *B32B 27/12* (2013.01); *B32B 27/281* (2013.01);
(Continued)

(58) Field of Classification Search
CPC . B32B 2262/101; B32B 27/12; B32B 27/281; B32B 5/02; B61C 3/00;
(Continued)

(56) References Cited

U.S. PATENT DOCUMENTS

| 2,479,357 A | 8/1949 | Hill et al. |
| 3,254,150 A | 5/1966 | Rogers, Jr. |
| 4,038,741 A | 8/1977 | Schuler |

FOREIGN PATENT DOCUMENTS

| CH | 559451 A5 | 2/1975 |
| CN | 201266506 Y | 7/2009 |

(Continued)

OTHER PUBLICATIONS

Garnier "Nippnrika", NPL Reference No. XP055439671, p. 1-15, Apr. 25, 2017, Found on the Internet: URL:http://www.fiee.eom.br/novadocuments /354804?=636287423822970000, Jan. 10, 2018, pp. 4,12,13; 2017.

*Primary Examiner* — Lawrence D Ferguson
(74) *Attorney, Agent, or Firm* — Laurence Greenberg; Werner Stemer; Ralph Locher

(57) ABSTRACT

A coil of a stator winding of an electric machine is formed of a number of windings, which are wound together with a number of layers of a mica tape, on which a number of layers of a cover tape are in turn wound. The coil is a three-dimensional form-wound coil. The mica tape has a bending stiffness of less than 50 N/m according to specification IEC 60371-2:2004 and a static friction coefficient between the top side and the bottom side thereof of less than 0.7 according to specification ISO 8295:1995.

5 Claims, 4 Drawing Sheets

(51) Int. Cl.
    *B32B 5/02*          (2006.01)
    *B32B 27/28*        (2006.01)
    *B61C 3/00*         (2006.01)
    *H02K 3/34*         (2006.01)
    *H02K 3/44*         (2006.01)

(52) U.S. Cl.
    CPC ................. *B61C 3/00* (2013.01); *H02K 3/34* (2013.01); *H02K 3/44* (2013.01); *B32B 2262/101* (2013.01)

(58) Field of Classification Search
    CPC ........ H02K 2213/03; H02K 3/30; H02K 3/34; H02K 3/44
    See application file for complete search history.

(56) References Cited

FOREIGN PATENT DOCUMENTS

| | | |
|---|---|---|
| CN | 104485767 A | 4/2015 |
| JP | S60237828 A | 11/1985 |
| JP | H02156605 A | 6/1990 |

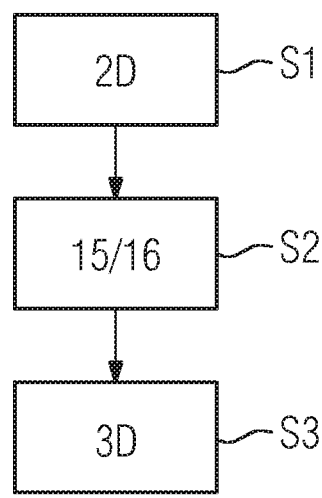
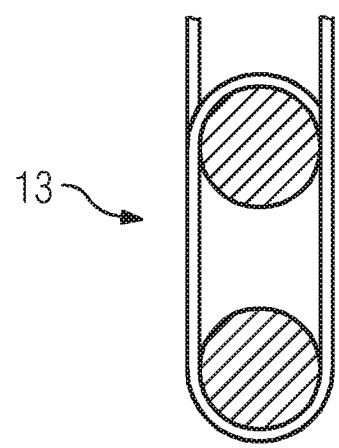

FORM-WOUND COIL HAVING PREVIOUS WINDING OF MICA TAPE

BACKGROUND OF THE INVENTION

Field of the Invention

The present invention relates to a coil of a stator winding of an electric machine,
wherein the coil consists of a number of windings which are wound together with a number of layers of a mica tape, on which a number of layers of a cover tape are in turn wound,
wherein the coil is designed as a three-dimensional form-wound coil.

The present invention relates further to an electric machine, wherein the electric machine has a stator and a rotor, wherein the stator has stator slots into which a stator winding is introduced, wherein the stator winding has coils, wherein at least one of the coils is embodied as a coil, as described above.

The present invention relates further to an electric drive, wherein the drive has an electric machine of this type, a converter and a control facility for the converter, wherein the electric machine can be connected by the control facility by way of the converter to a supply voltage which is greater than 350 V, in particular greater than 1.0 kV, for instance up to 4.5 kV.

The present invention relates further to a rail vehicle, wherein as a traction drive the rail vehicle has an electric drive of this type.

With electric machines, one or more layers of mica tape are applied to the coils of the stator winding for main wall insulation. This takes place, inter alia, in order to increase the moisture resistance and the heat class of the coil. In particular, with electric machines which are used as a traction drive in rail vehicles, this structure is additionally protected against mechanical influences by a layer of fabric cover tape. The fabric cover tape has exclusively a mechanical protective function. The moisture resistance and the heat class of the main wall insulation are by contrast determined decisively by the number of layers of mica tape.

With coils designed as form-wound coils, it is known to initially manufacture a flat coil, which, on account of its form, is typically referred to as race track loop (two long straight lines which are connected to one another by way of two sections which are curved in the manner of a semi-circle). This coil is then shaped into the form-wound coil by means of a molding process. With form-wound coils of this type, it is further known to attach the layers of mica tape to the coil after forming the (three-dimensional) form-wound coils. This procedure generally takes place manually. The manual attachment of the mica tape is time-consuming and prone to error.

Attempts have already been made to attach the layers of mica tape to the then still flat coil prior to forming the three-dimensional form-wound coil and to form the flat coil which is already wound with mica tape (and possibly also the cover tape) into the form-wound coil. This procedure is known as flat technology. With coils for electric drives, which are used in "normal" applications, this procedure has proven to be feasible. For traction drives and similar applications, in which the electric machine of the drive is exposed to harsh environmental conditions, it was previously not possible, however, to produce form-wound coils in this way, which in practice have the required reliability—in particular moisture resistance.

SUMMARY OF THE INVENTION

The object of the present invention consists in making available possibilities, by means of which form-wound coils, electric machines and drives can be produced in a simple and cost-effective manner and are particularly suited to use in traction drives.

The object is achieved by a coil as claimed. Advantageous embodiments of the coil form the subject matter of the dependent claims.

In accordance with the invention, a coil of the type cited in the introduction is configured such that the mica tape has a bending stiffness of below 50 N/m according to DIN EN 60371-2 (version 2005) and between the top side and the bottom side thereof a static friction coefficient of less than 0.7 according to DIN EN ISO 8295 (version 2004).

By using a flexible mica tape of this type, it is possible for the mica tape to connect to the still flat coil in an almost fold-free manner when the still flat coil is wound. As a result, it is possible for the layers of mica tape to be displaced with respect to one another when the flat coils are formed into form-wound coils, without layers becoming stuck on folds. By using a mica tape with corresponding static friction coefficients, it is possible for the layers of the mica tape to be reproducibly displaced with respect to one another when the coil is formed into a form-wound coil. In particular, by combining these two properties, it is therefore possible for no gaps to appear when the coil is formed into the form-wound coil, for therefore the actual coil (=the number of windings of metallic conductors, in most cases conductors made from flat copper strip) to remain reliably covered all over by an adequate number of layers of the mica tape.

It is generally sufficient if the mica tape has the afore-cited properties. It may be advantageous, however, to realize these properties also with the cover tape. It may therefore be advantageous for the cover tape to have a static friction coefficient of below 0.7 according to DIN EN ISO 8295 (version 2004) between the top side and the bottom side thereof and/or for the cover tape and the mica tape to be matched to one another so that with respect to the mica tape the cover tape has a static friction coefficient of below 0.7 according to DIN EN ISO 8295 (version 2004).

The mica tape and the number of layers of the mica tape are preferably matched to one another so that the coil has a heat class of 200° C. or better according to IEC 60034-18-31 (version 2017). This represents an improvement compared with the prior art, in which a heat class of 180° C. can typically be reached. A heat class of 220°, in some instances even a heat class of 250° can be easily implemented.

In a preferred embodiment of the coil, the cover tape has per se two layers, wherein in each case one of these two layers is a fabric and the other a film, the fabric consists of a glass fiber or of a first high-performance polymer and the film consists of a second high-performance polymer. By means of this embodiment, it is possible for the cover tape not only to bring about a mechanical protective function, but, albeit only in a relatively small periphery, an electric protective function and a high heat class can still be realized. The second high-performance polymer can in particular be a polyimide. In this regard the fabric generally faces away from the layers of the mica tape, the film faces the layers of the mica tape.

The object is further achieved by an electric machine as claimed. In accordance with the invention, with an electric machine of the type cited in the introduction, at least one of the coils is embodied in accordance with the invention.

The object is further achieved by an electric drive as claimed. In accordance with the invention, the electric machine of the electric drive is embodied according to the invention.

The object is also achieved by a rail vehicle as claimed. In accordance with the invention, the rail vehicle has, as a traction drive, an inventive electric drive.

The properties, features and advantages of this invention described above as well as the manner in which they are achieved will become clearer and more comprehensible in conjunction with the following description of the exemplary embodiments, which are explained in more detail in conjunction with the drawings, which show, in a schematic representation:

DESCRIPTION OF THE INVENTION

Figure 1:
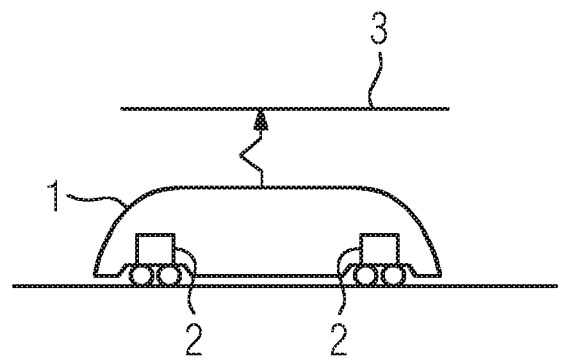
FIG. 1 a rail vehicle,
FIG. 2 an electric drive
FIG. 3 an electric machine,
FIG. 5 a cross-section through a coil,
FIG. 6 a series of layers of tapes,
FIG. 7 a top view of a top side of a cover tape,
FIG. 8 a top view of a bottom side of a cover tape,
FIG. 9 a flow chart and
FIG. 10 a flat coil.

According to FIG. 1, a rail vehicle 1 (for instance an electric locomotive) has at least one traction drive 2. According to FIG. 1 the traction drive 2 is supplied with electrical energy by way of a contact wire 3. Another type of supply is also conceivable, however, by way of a diesel drive, which drives an electric generator, for instance.

The traction drive 2 is an example of an electric drive. In conjunction with the traction drive 2, the present invention is explained in more detail below. The electric drive could also be used for other purposes, however. In general the term "drive" and furthermore the reference character 2 are therefore only used below in general.

Figure 2:
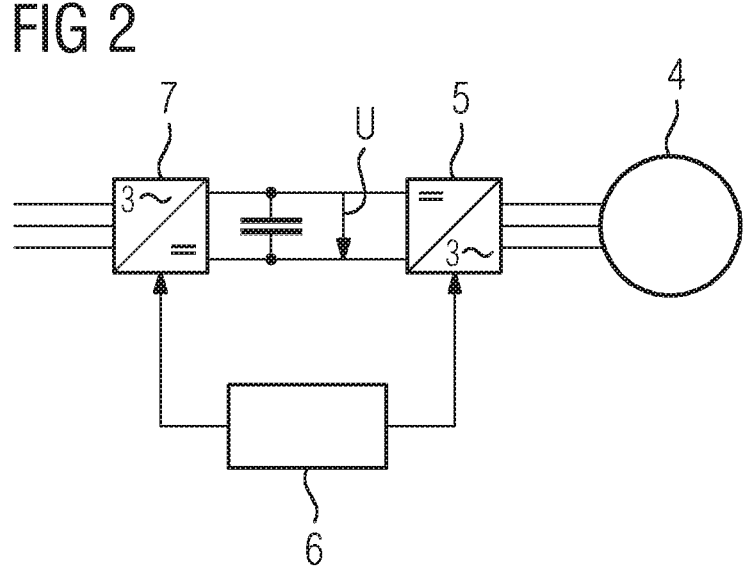

According to FIG. 2 the electric drive 2 has an electric machine 4, a converter 5 and a control facility 6 for the converter 5. In many cases a rectifier 7 is further arranged upstream of the converter 5. This is not absolutely necessary, however. The electric machine 4 can be connected via the converter 5 to a supply voltage U by means of the control facility 6. If the rectifier 7 is available and controllable, control of the rectifier 7 generally takes place likewise by means of the control facility 6.

The supply voltage U, in other words that voltage which is applied to the motor terminals of the electric machine 4, is generally greater than 350 V, in particular in most cases greater than 1 kV. It can even be greater than 1.0 kV, for instance between 2 kV and 3 kV. In some instances it may amount to up to 4.5 kV.

Figure 3:
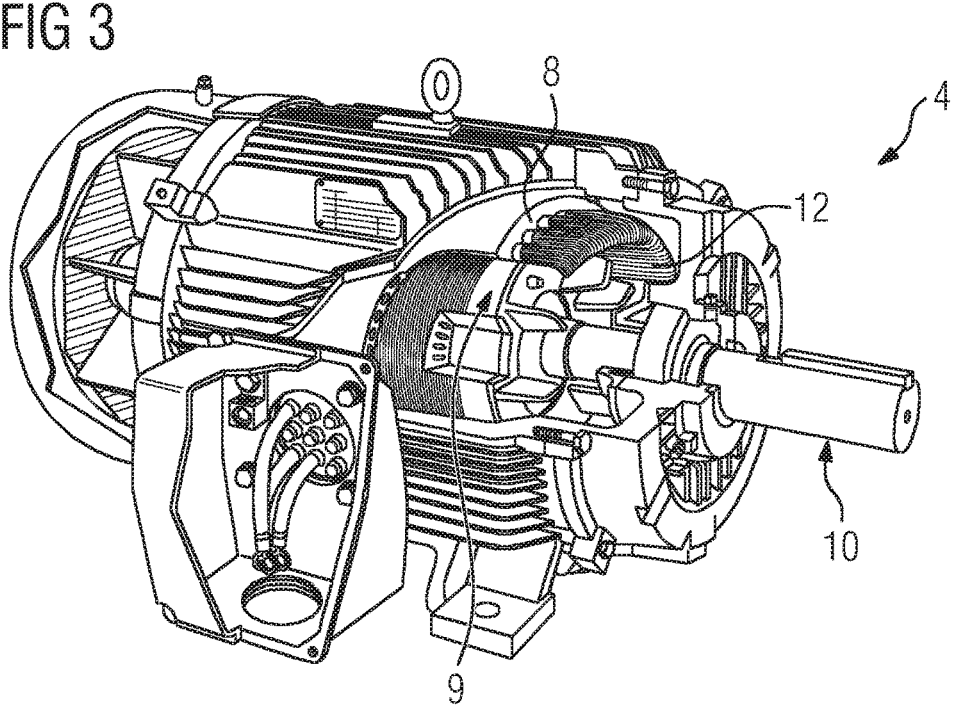

According to FIG. 3 the electric machine has a stator 8 and a rotor 9. The rotor 9 is arranged in a torsion-resistant manner on a rotor shaft 10, which for its part can be rotated about an axis of rotation. According to FIGS. 3 and 4 the stator 8 has stator slots 11. A stator winding 12 (see FIG. 3) is introduced into the stator slots 11. The stator winding 12 has coils 13 (see FIG. 4), wherein in FIG. 4 for the sake of clarity only one of the coils 13 is shown. The embodiment of the coil 13 is the actual subject matter of the present invention.

Figure 5:
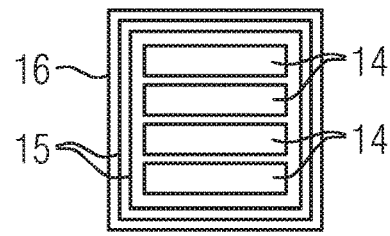

According to FIG. 5 the coil 13 consists of a number of windings 14. The windings 14 typically consist of copper, and often copper strip. In any case, the windings 14 are provided with an electric insulation, not shown separately, for instance a protective paint. The number of windings 14 can be dependent on requirements. The number of four windings 14 shown in FIG. 5 is purely exemplary.

According to FIG. 5 the windings 14 are wound, namely not individually but instead together, with a number of layers of a mica tape 15. The number of layers of the mica tape 15 can be 1. Often it is greater than 1. The number of two layers shown in FIG. 5 is purely exemplary, however. A number of layers of a cover tape 16 is wound onto the layers of mica tape 15, precisely onto the outermost layer of the mica tape 15. The number of layers of the cover tape 16 can be greater than 1. Generally only one layer of mica tape 16 is wound, however. The cover tape 16 is generally the outermost layer of the finished coil 13. After winding the coil 13 with the cover tape 16, the finished coil 13 is therefore inserted into the stator 9 or more precisely into two of the stator slots 11.

If the coil 13 is produced using what is known as flat technology, the mica tape 15 should have the highest possible flexibility and as low a static friction coefficient between the top side and the bottom side as possible. In particular, the bending stiffness should lie below 50 N/m according to DIN EN 60371-2 (version 2005). The static friction coefficient (defined in the same standard) should lie below 0.7. Examples of suitable mica tapes are RikaFibrel E364N and RikaFibrel E464N of the Nippon Rika Group.

It is possible for the mica tape 15 to have the afore-cited material properties permanently. The material properties of the mica tape 15 must however be provided at least at the time of manufacturing the coil 13. At the time of manufacturing the coil 13, the static friction coefficient can in particular also be effected by a layer of grease or oil between the layers of the mica tape 15. A layer of grease or oil of this type is however also still present even after manufacturing the coil 13, but only volatilizes after a longer period of time so that when a layer of grease or oil is applied the corresponding static friction coefficient can be considered to be a material property of the mica tape 15.

The above embodiments relating to the mica tape 15 preferably also apply to the cover tape 16. The cover tape 16 between the top side and bottom side thereof preferably also has a static friction coefficient of below 0.7 according to DIN EN ISO 8295 (version 2004). Furthermore, the cover tape 16 and the mica tape 15 are preferably matched to one another so that the cover tape 16 has a static friction coefficient of this type with respect to the mica tape 15. The above statements relating to the application of layers of grease or oil are also applicable here.

Figure 6:
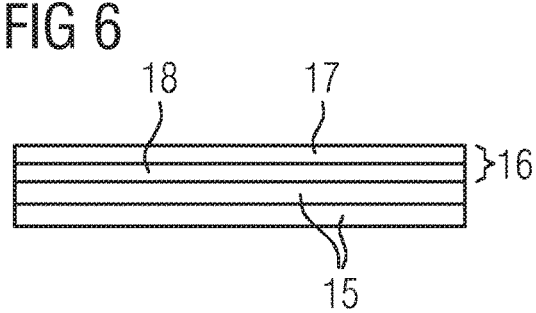
Figure 7:
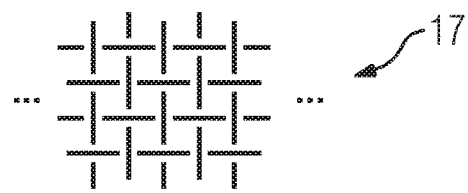
Figure 8:
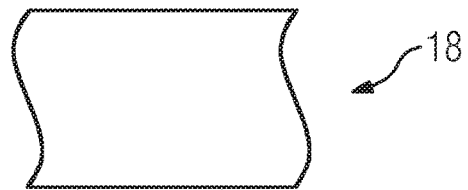

According to FIGS. 6 to 8 the cover tape 16 is preferably embodied as a laminate which has a sequence of two layers 17, 18. One of these two layers 17, 18 is a fabric 17 and one is a film 18 in each case. The cover tape 16 does not contain further component parts. The film 18 therefore adjoins the fabric 17 directly. The fabric 17 generally faces away from the layers of the mica tape 15 and corresponding hereto the film 18 faces the layers of the mica tape 15. The reverse sequence of fabric 17 and film 18 is in principle also possible, however.

The fabric 17 preferably consists of a glass fiber. Alternatively, it can consist of a first high-performance polymer. The first high-performance polymer can be a polyimide, but is preferably an aramid, in particular a meta (m) aramid or a para (p) aramid. The film 18 consists of a second high-performance polymer. The second high-performance polymer can be an aramid, in particular a meta (m) aramid or a para (p) aramid. The second high-performance polymer is preferably a polyimide, however. One example of a suitable cover tape 16 is Voltaflex GK2979 of Isovolta AG.

Figure 4:
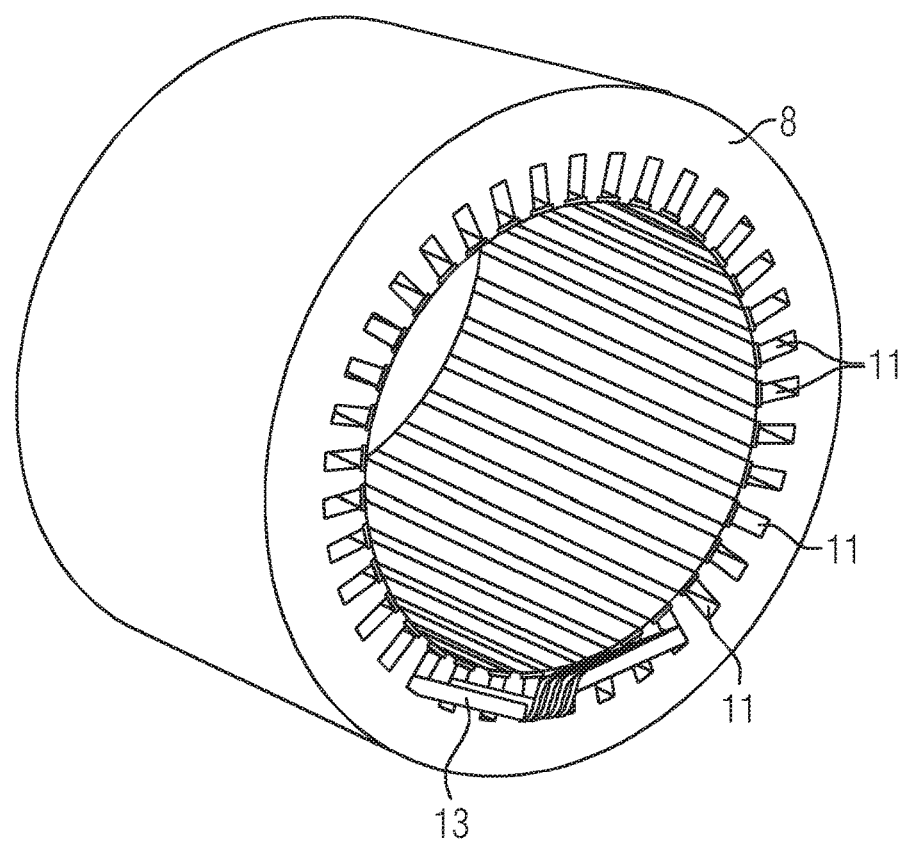

In accordance with the invention, the coil 13, as identifiable in FIG. 4, is embodied as a three-dimensional form-wound coil. In accordance with the invention, according to the display in FIG. 9 the coil 13 is firstly wound as a flat coil in a step S1. This is indicated in step S1 by the designation "2D". The flat coil is shown purely by way of example in FIG. 10. Subsequently in a step S2, the layers of mica tape 15 and cover tape 16 are applied to the flat coil, in other words before deforming into the form-wound coil. This is shown in step S2 by the designation "15, 16". The already wound flat coil is only shaped to form the three-dimensional form-wound coil in a step S3. This is indicated in step S3 by the designation "3D".

During the molding process (step S3) the layers of mica tape 15 are displaced with respect to one another and/or the layers of the cover tape 16 against one another. In some instances, the innermost layer of the cover tape 16 which adjoins the outermost layer of the mica tape 15 are displaced relative to one another. The displacements are a constructive feature of the coils 13 which results due to the manufacturing process.

With one individual layer of mica tape 15, a specific heat class according to IEC 60034-18-31 (version 2017) can be achieved. Each further layer of mica tape 15 increases the heat class. The mica tape 15 and the number of layers of the mica tape 15 are preferably matched to one another so that the coil 13 has a heat class of 200° C. or better (according to the cited standard).

In summary, the present invention relates to the following facts:

A coil 13 of a stator winding 12 of an electric machine 4 consists of a number of windings 14 which are wound together with a number of layers of a mica tape 15, onto which a number of layers of a cover tape 16 are in turn wound. The coil 13 is embodied as a three-dimensional form-wound coil. The mica tape 15 has a bending stiffness of below 50 N/m according to DIN EN 60371-2 (version 2005) and between the top side and the bottom side thereof a static friction coefficient of less than 0.7 according to IEC EN ISO 8295 (version 2004).

The present invention has many advantages. In particular, for traction drives 2 and similar applications, electric machines 4 can first be used with form-wound coils 13, which are wound with mica tape 15 and cover tape 16 before the three-dimensional molding process. The moisture resistance and the temperature index are improved significantly. In particular, a heat class of 200° C. or better can be reached. Furthermore, the mechanical protection is also improved.

Although the invention has been illustrated and described in greater detail on the basis of the preferred exemplary embodiment, the invention is not limited by the disclosed examples and other variations may be derived herefrom by the person skilled in the art without leaving the scope of protection of the invention.

The invention claimed is:

1. A coil of a stator winding of an electric machine, the coil comprising:
   a plurality of windings, a number of layers of mica tape commonly wound about said plurality of windings, and a number of layers of cover tape wound onto said layers of mica tape,
   said windings, said mica tape, and said cover tape forming a three-dimensional form-wound coil; and
   said mica tape having a bending stiffness of less than 50 N/m according to IEC 60371-2:2004 and a static friction coefficient, between a top side and a bottom side thereof, of less than 0.7 according to ISO 8295:1995.

2. The coil according to claim 1, wherein said cover tape has a static friction coefficient, between a top side and a bottom side thereof, of less than 0.7 according to ISO 8295:1995 and/or said cover tape and said mica tape are matched to one another so that, with respect to said mica tape, said cover tape has a static friction coefficient of less than 0.7 according to ISO 8295:1995.

3. The coil according to claim 1, wherein said mica tape and said number of layers of said mica tape are matched to one another so that the coil has a heat class of 200° C. or better according to IEC 60034-18-31:2017.

4. The coil according to claim 1, wherein said cover tape has two layers per se, with one of said two layers being a fabric and the other of said two layers being a film in each case and wherein said fabric is formed of glass fibers or of a first high-performance polymer and said film consists of a second high-performance polymer.

5. The coil according to claim 4, wherein said second high-performance polymer is a polyimide.

* * * * *